(12) United States Patent
Palfenier et al.

(10) Patent No.: US 6,205,858 B1
(45) Date of Patent: Mar. 27, 2001

(54) VEHICLE SPEED SENSOR

(75) Inventors: Samuel Roland Palfenier, El Paso, TX (US); Cecilia Hernandez, CD. Juarez Chih. (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/448,668

(22) Filed: Nov. 24, 1999

(51) Int. Cl.⁷ ................................. G01P 3/00; G01P 3/48
(52) U.S. Cl. .................. 73/514.39; 324/173; 324/174; 324/207.15
(58) Field of Search ........................... 73/488, 514.39, 73/514.31; 324/207.15, 173, 174

(56) References Cited

U.S. PATENT DOCUMENTS

| | | | |
|---|---|---|---|
| 5,278,496 | * | 1/1994 | Dickmeyer ........................ 324/174 |
| 5,507,089 | * | 4/1996 | Dickmeyer ....................... 324/207.15 |
| 5,563,510 | * | 10/1996 | Gorrell et al. ..................... 324/174 |
| 5,675,248 | * | 10/1997 | Kurita et al. ...................... 324/174 |
| 5,742,159 | * | 4/1998 | Babin et al. ....................... 324/173 |
| 5,744,951 | * | 4/1998 | Babin et al. ....................... 324/173 |
| 5,929,629 | * | 7/1999 | Hiraoka et al. .................... 324/174 |
| 5,998,988 | * | 12/1999 | Dickmeyer et al. ................ 324/174 |
| 6,003,375 | * | 12/1999 | Ouchi et al. ...................... 73/514.39 |

* cited by examiner

*Primary Examiner*—Richard A. Moller
(74) *Attorney, Agent, or Firm*—Margaret A. Dobrowitsky

(57) ABSTRACT

A speed sensor (10) includes a sensor housing (12) mounted to the wall of a transmission, and a pole piece (34) extends out of the sensor housing (12) into the transmission fluid. The pole piece (34) is held by a plastic spool (26) within the sensor housing (12), and an electric coil (28) surrounds the spool (26) and is magnetically coupled to the pole piece (34). The spool (26) is formed with a rib ring (41) that extends away from the pole piece (34) and that terminates in an outer periphery that is closely spaced from the inside wall of the sensor housing (12). To block metal particles in the fluid from entering between the spool (26) and sensor housing (12) that would otherwise damage the coil (28), two ribs (60) are formed on the outer periphery of the spool (26), and an interference fit is established between the ribs (60) and the sensor housing (12) such that the ribs (60) are deformed and the contaminants thereby blocked.

11 Claims, 1 Drawing Sheet

VEHICLE SPEED SENSOR

TECHNICAL FIELD

The present invention relates to vehicle speed sensors.

BACKGROUND OF THE INVENTION

Transmission-mounted vehicle speed sensors have been provided to sense the speed of a vehicle. Because exposed portions of such sensors typically contact the transmission fluid to permit the sensor to function as intended, and unexposed portions of the sensors can be damaged by contact with contaminated transmission fluid, it is important to establish a seal between the fluid and the unexposed portions or to filter out the contaminants in the fluid. For instance, metal particles in the transmission fluid, were the fluid to leak into a sensor housing that houses an electric coil (a typical sensor component), could be detrimental to the functioning of the coil by shorting it out.

As understood herein, an o-ring (a toroidal rubber or plastic ring) can be used to establish a fluid seal to prevent leakage of transmission fluid into the housing, but o-rings can fail, or be damaged, thereby losing their effectiveness. Moreover, incorporating an o-ring into a sensor entails an added part as well as an added manufacturing step, thus increasing the cost of the sensor. The present invention recognizes that it is possible to provide a sensor having a portion exposed to engine fluid while blocking contaminants in the fluid from contacting the coil, without requiring o-rings or separate sealing devices.

SUMMARY OF THE INVENTION

A vehicle sensor is disclosed that is insertable into a vehicle transmission fluid. The sensor includes a spool that is disposed within a sensor housing, and the spool holds electromagnetic sensing structure including at least one coil. At least one rib extends outwardly from the spool and engages, in an interference fit, an interior surface of the housing, such that transmission fluid leakage past the rib onto the coil is impeded.

The present invention will now be described, by way of example, with reference to the accompanying drawings, in which:

DESCRIPTION OF AN EMBODIMENT OF THE INVENTION

Figure 1:
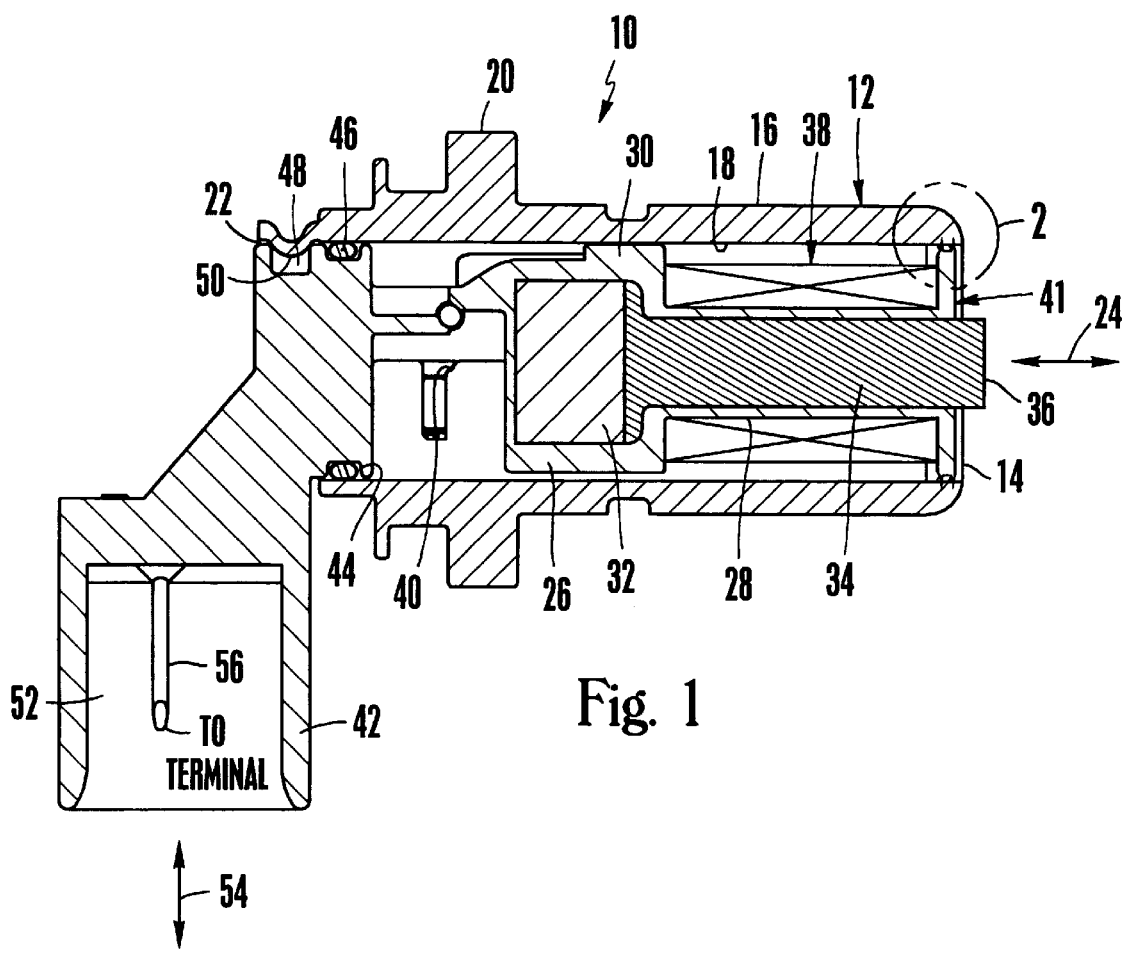
FIG. 1 is a cross-sectional view of the sensor.

Referring initially to FIG. 1, a transmission-mounted speed sensor is shown, generally designated 10, that includes a metal or more preferably plastic hollow generally cylindrical sensor housing 12 having an open distal end 14. The sensor housing defines an outer wall 16 and an interior surface 18, and an abutment flange 20 is formed on the outer surface 16 to abut a transmission housing, with the open distal end 14 being disposed within the transmission housing in contact with transmission fluid. Opposite the open distal end 14, the sensor housing 12 is formed with an open proximal end 22, with a sensor housing axis 24 being defined between the ends 14, 22.

As shown in FIG. 1, a hollow plastic generally "T"-shaped spool 26 is disposed within the sensor housing 12. As shown, the spool 26 includes a hollow cylindrical pole piece holder 28 that terminates at its proximal end in an enlarged magnet holder 30. Sensing structure including a magnet 32 fills the magnet holder 30 and an elongated pole piece 34 fills the pole piece holder 28 as shown. The magnet 32 is magnetically coupled to the pole piece 34, and indeed the magnet 32 contacts the pole piece. If desired, a distal segment 36 of the pole piece 34 can extend beyond the distal end 14 of the sensor housing 12.

FIG. 1 also shows that the sensing structure of the sensor 10 includes a hollow toroidal coil 38 of wire that closely surrounds the pole piece holder 28 of the spool 26. The coil 38 is magnetically coupled to the pole piece 34/magnet 32. One or more electrical leads connect the coil 38 to terminals 40. A hollow disk-shaped rib ring 41 is made integrally with the pole piece holder 28 and the rib ring 41 extends radially outwardly from the distal end of the pole piece holder 28 and with the coil 38 being ensconced behind (i.e., proximal to) the rib ring 41. With this structure, the pole piece 34 can be, e.g., coupled to a rotating component of a vehicle transmission, with an electric current that is representative of the speed of rotation accordingly being generated in the coil 38.

Additionally, a metal or more preferably plastic connector housing 42 is held within the proximal end 22 of the sensor housing 12 as shown. If desired, the connector housing 42 can be formed with an o-ring groove 44, and an o-ring 46 can be disposed in the groove 44 to establish a seal between the housings 12, 42. Moreover, the connector housing 42 can be formed with an engagement groove 48 and the sensor housing 12 can be formed with an inwardly curved engagement rib 50 that is received in the groove 48. At the junction of the groove 48 and engagement rib 50, the housings 12, 42 can be heat-staked together to hold the housings 12, 42 together.

Still referring to FIG. 1, the connector housing 42 defines a hollow socket 52, and the socket 52 establishes an axis 54 that is orthogonal to the sensor housing 12 axis 24. One or more connectors, such as a pin 56, are supported within the socket 52, it being understood that the pin 56 is electrically connected to the coil 38 through the terminals 40. The socket 52 is configured for engaging a complementarily-shaped connector (not shown) of a vehicle instrumentation system, for receiving the signal from the coil 38.

Figure 2:
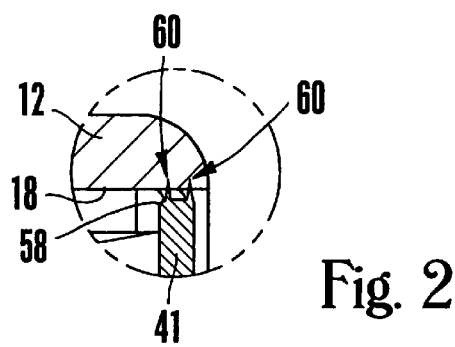
FIG. 2 is a detail view as seen as indicated by the circle 2 in FIG. 1.

Having described the overall structure of the sensor 10, attention is now directed to FIG. 2, which shows the details of the contaminated fluid seal between the housings 12, 42 near the distal end 14. As shown, the rib ring 41 of the spool 26 defines an outer periphery 58, and at least one and preferably two radially tapered ribs 60 are formed on the outer periphery 58 integrally with the spool 26. As shown, each rib 60 extends radially outwardly from the rib ring 41 of the spool 26. Stated differently, the ribs 60 are formed circumferentially on the periphery 58 of the rib ring 41.

In accordance with the present invention, each rib 60 engages, in an interference fit, the interior surface 18 of the sensor housing 12. Indeed, the ribs 60 are crushed or otherwise deformed when the spool 26 is engaged with the sensor housing 12, with the taper of the ribs 60 promoting their deformation and, hence, promoting a barrier for the contaminants (i.e., metal particles) in the fluid. With this structure, transmission fluid that leaks past the ribs 60 onto the coil 38 is free of contaminants that would otherwise damage the coil.

What is claimed is:

1. A vehicle sensor (10) insertable into a vehicle transmission fluid, the sensor (10) including a spool (26) disposed within a sensor housing (12), the spool (26) holding electromagnetic sensing structure including at least one coil (28), the improvement comprising:

at least one rib (60) extending outwardly from the spool (26) and engaging, in an interference fit, an interior surface (18) of the housing (12), whereby transmission fluid leakage past the rib (60) onto the coil (28) is impeded.

2. The sensor of claim 1, wherein the spool (26) includes a pole piece holder (28) holding a pole piece (34) of the sensing structure and a rib ring (41) extending radially outwardly from the pole piece holder (28), the rib ring (41) defining an outer periphery, the rib (60) being formed circumferentially on the periphery.

3. The sensor of claim 2, comprising two ribs (60).

4. The sensor of claim 2, further comprising a connector housing (42) supporting a connector (56), the connector (56) being electrically coupled to the coil (28), the connector housing (42) being connected to the sensor housing (12).

5. The sensor of claim 4, wherein the connector housing (42) is formed with at least one engagement groove (48) and the sensor housing (12) is formed with at least one engagement rib (50) received in the groove (48) and heat-staked thereto to hold the housings (12, 42) together.

6. The sensor of claim 4, wherein the connector housing (42) defines a first axis and the sensor housing (12) defines a second axis, the axes being orthogonal to each other.

7. The sensor of claim 2, wherein the pole piece (34) contacts the transmission fluid, and the sensing structure further includes:

at least one magnet (32) magnetically coupled to the pole piece (34), wherein the coil (28) surrounds at least a portion of the pole piece (34) and the spool (26) holds at least the magnet (32) and the pole piece (34).

8. The sensor of claim 7, wherein the spool (26) is disposed between the coil (28) and the pole piece (34).

9. The sensor of claim 3, wherein the ribs (60) are deformed when the sensor housing (12) is engaged with the spool (26).

10. The sensor of claim 1, wherein the rib (60) is formed integrally with the spool (26).

11. The sensor of claim 1, wherein the rib (60) is radially tapered to promote deformation of the rib (60).

* * * * *